US005487904A

United States Patent [19]
Caly

[11] Patent Number: 5,487,904
[45] Date of Patent: * Jan. 30, 1996

[54] BEVERAGE BASE OF COCOA COATED SUGAR GRAINS

[75] Inventor: William G. Caly, Jougne, France

[73] Assignee: Nestec S.A., Vevey, Switzerland

[ * ] Notice: The portion of the term of this patent subsequent to Aug. 16, 2011, has been disclaimed.

[21] Appl. No.: 248,323

[22] Filed: May 24, 1994

Related U.S. Application Data

[63] Continuation of Ser. No. 846,595, Mar. 5, 1992, Pat. No. 5,338,555.

[30] Foreign Application Priority Data

Mar. 28, 1991 [EP] European Pat. Off. .............. 91104934

[51] Int. Cl.$^6$ ................... A23C 9/156; A23G 1/00
[52] U.S. Cl. ................. 426/96; 426/588; 426/593; 426/658
[58] Field of Search ............... 426/96, 593, 658, 426/588

[56] References Cited

U.S. PATENT DOCUMENTS

| | | |
|---|---|---|
| 3,385,710 | 5/1968 | Reymond . |
| 3,472,658 | 10/1969 | Isaacs . |
| 3,904,777 | 9/1975 | Goerling et al. . |
| 4,338,350 | 7/1982 | Chen et al. . |

FOREIGN PATENT DOCUMENTS

| | | |
|---|---|---|
| 835323 | 2/1970 | Canada . |
| 1073732 | 3/1980 | Canada . |

Primary Examiner—Jeanette Hunter
Assistant Examiner—Mary S. Mims
Attorney, Agent, or Firm—Vogt & O'Donnell

[57] ABSTRACT

A beverage base of crystallized sugar grains having a mean diameter of 250 μm to 500 μm and a cocoa powder coating has a poured apparent voluminal mass (d1) of from 630 g/l to 750 g/l, a free apparent voluminal mass (d2) of from 750 g/l to 860 g/l and a degree of compressibility (d2-d1)/d2 below 20%.

17 Claims, No Drawings

BEVERAGE BASE OF COCOA COATED SUGAR GRAINS

CROSS REFERENCE TO RELATED APPLICATION

This application is a continuing application of application Ser. No. 07/846,595, filed Mar. 5, 1992, Now U.S. Pat. No. 5,338,555.

BACKGROUND OF THE INVENTION

Products intended for this particular field of activity have to satisfy very stringent requirements.

First of all, they have to show satisfactory storage properties and, in particular, should be largely unaffected by moisture. Accordingly, they should be substantially non-hygroscopic. In addition, since these products consist of a mixture of sugar and cocoa, which are two elements of different density, they should show no signs of separation as a function of time through differential sedimentation of the sugar and cocoa which would take the densest products to the bottom of the storage tank.

Secondly, since these products are intended for use in existing machines, they have to show predetermined and reproducible flow characteristics to ensure that a constant and predetermined dose of the products is always dispensed without any need to modify the setting of the dosing units. The dosing units typically used are, for example, of the Spengler or Wittenborg type which are set up to deliver reproducible doses, for example of 25 g, from the products normally sold in these machines.

Thirdly, the products have to dissolve instantly in hot water without the beverage having to be stirred, for example with a spoon.

Finally, all these characteristics have to be obtained using predetermined compositions.

The products typically used consist of a dry mixture of crystallized sugar and cocoa powder with, optionally, milk powder and such additives as salt or vanilla extract.

Accordingly, these products inevitably have a pronounced tendency towards differential sedimentation. In addition, the free sugar is extremely sensitive to moisture which presents storage problems.

Canadian Pat. No. 1,073,732 describes a process in which a very fine sugar having a particle size below 250 m is moistened with 3% water, a mixture of cocoa and additives is separately prepared, after which the sugar and the mixture are introduced into a mixer heated to a temperature of 50° C. to 90° C. at a heating rate of 1.5° C. to 13° C. per minute. The product is then rapidly cooled and reduced to powder with a final density of 500 to 600 g per litre and a particle size distribution in which 100% of the product is smaller than 840 µm in size and 60% is larger than 250 µm in size.

In the cited document, the density mentioned corresponds to what is conventionally called the poured apparent voluminal mass. This is because it is standard practice to distinguish between the poured apparent voluminal mass calculated with a powder which has just been poured into a graduated container and the free apparent voluminal mass calculated with a powder compacted after tapping 100 times. Futher particulars of the poured and free apparent voluminal masses can be found in FIL (Fédération Internationale de Laiterie) Standard No. 134:1986 which explains the exact methods. In the following description, the poured and free apparent voluminal masses were measured by the method specified in that Standard.

The product obtained by the method described in Canadian Patent No. 1,073,732 has a major problem. This is because it is not possible to obtain any reproducibility in the flow of this product, the conditions governing its flow definitely not being controlled, even remotely, in this document. This is, after all, normal because the product in question is not inended for use in an automatic dispenser, as reflected in the use of a spoon for dosing and in the use of hot milk, which are two methods which simply could not be considered in the context of an automatic dispenser.

SUMMARY OF THE INVENTION

The present invention provides a dry base of crystallized grains cocoa powder and coated with a poured apparent voluminal mass $d_1$ of 630 g/l to 750 g/l, a free apparent voluminal mass $d_2$ of 750 g/l top 860 g/l and a degree of compressibility $/d_2$ of less than 20%. The coating may be a mixture of a cocoa powder and additional ingredients, such as milk powder and other ingredients, such as salt or vanilla extract.

By virtue of its low degree of compressibility on the one hand and its high apparent voluminal mass on the other hand, the product has excellent flow characteristics so that it is possible reproducibly to obtain, using the dosing units typically employed in automatic beverage dispensers, a predetermined dose of dry product identical with that delivered from the products normally dispensed in these machines, for example of 25 g, without any need to change the setting of the dosing units.

In addition, by virtue of this structure of the dry base, the powder obtained is totally homogeneous in regard to its grains and, accordingly, shows no signs of separation between the sugar and the cocoa in the event of prolonged storage. In addition, since the grains of sugar are coated with a mixture of cocoa powder and additional ingredients, the coating, which is less hydrophilic than the free sugar, provides the product with remarkable hygroscopic characteristics.

The present invention also relates to a process for producing a dry base as described above, in which a crystallized sugar having a mean grain diameter of 250 µm to 500 µm is brought to a moisture content of 5% to 12% by weight, a dry mixture consisting of cocoa powder and other ingredients is separately formed, after which the moistened sugar is incorporated in the dry mixture, mixed and dried.

Other features and advantages will become apparent from the following description.

DETAILED DESCRIPTION OF THE INVENTION

In the text of the following description, the voluminal masses are expressed in g/l, while grain sizes are expressed in µm.

A laser instrument of the Malvern type was used to measure the grain sizes. The samples are first sieved through a 1,400 µm mesh sieve to ensure the absence of any coarse particles which would falsify the result. The mean diameter of the particles is calculated from three measurements for each sample so that the measurement varies over a range of less than 5%. In the following description, all the grain sizes were measured by this method.

In the process according to the invention, a crystallized sugar having a mean grain diameter of 250 µm to 500 µm is moistened to a water content of 5 to 12% by weight. In this moistening phase, therefore, a "fondant" of sugar is formed in which each grain retains its individuality by being only surface-wetted. At the same time, a dry mixture is prepared from a cocoa powder, milk powder and other ingredients, such as salt or vanilla extract.

In a following operation, the dry mixture and the moistened sugar are introduced into a mixer of the turbulent type, for example a blade mixer, and then mixed. During this mixing phase, the moistened grains of sugar are coated with dry mixture and, the more moist the sugar, the thicker the coating will be. Similarly, the longer the mixing time, the thicker the coating will be.

The mixture as a whole of the crystallized sugar and the dry mixture preferably has the following composition in percent, based on the total dry matter weight:

| | |
|---|---|
| sugar | 45% to 60% |
| cocoa | 10% to 15% |
| milk powder | 20% to 35% |
| other additives | 5% to 11%. |

The product issuing from the blade mixer is dried with hot air to individualize each grain of sugar coated with the dry mixture.

The end product obtained in this way flows freely, is stable in storage and can be dispersed in hot water so that it is suitable for use in automatic hot drink dispensers.

EXAMPLES

The invention is illustrated by the following Examples.

The following Examples refer to two different compositions of the end product, expressed in percent based on dry matter weight.

| | Composition A | Composition B |
|---|---|---|
| Sugar | 47% | 55% |
| Milk powder | 33% | 22% |
| Cocoa | 14% | 12% |
| Whey, salt, vanilla extract | 6% | 11% |
| Total | 100% | 100% |

Example 1

The following Table illustrates the effect of the time taken to mix the moistened sugar and the dry mixture on the poured and free apparent voluminal masses and hence on the degree of compressibility, the quantity of water introduced amounting to 10% by weight, based on the quantity of sugar. The formulation used corresponds to composition A and the mean diameter of the sugar is 261 µm.

| Mixing time (minutes) | Poured apparent voluminal mass (g/l) | Free apparent voluminal mass (g/l) | Compressibility (%) |
|---|---|---|---|
| 5 | 750 | 870 | 13.8 |
| 4 | 762 | 846 | 9.6 |
| 4 | 762 | 854 | 10.4 |
| 2 | 734 | 802 | 8.5 |
| 2 | 740 | 820 | 8.9 |

It can thus clearly be seen that, the longer the mixing time, the higher the degree of compressibility.

Example 2

The following Table summarizes the results of tests in which the two compositions A and B were used with variations to:

the initial mean diameter of the sugar, the quantity of water added during moistening (expressed in percent, based on the weight of the sugar).

These tests were all carried out using the same dosing arrangement with no modifications to its setup parameters which were selected to deliver a dose of 25 g from the products normally delivered.

TABLE

Summary of the tests classified by grain size, quantity of water added to the sugar and dose delivered

| Test - composition | Mean diameter of sugar (µm) | Water (%) | Apparent voluminal mass Free (g/l) | Poured (g/l) | Compressibility (%) | Dose (g) | Sediments |
|---|---|---|---|---|---|---|---|
| 1 -B | 261 | 9 | 698 | 634 | 9.2 | 23.30 | |
| 2 -A | 261 | 9 | 715 | 644 | 9.9 | 24.65 | |
| 3 -A | 300 | 9 | 807 | 670 | 17.0 | 25.69 | + |
| 4 -A | 300 | 9 | 864 | 701 | 18.9 | 26.02 | + |
| 5 -A | 300 | 12 | 799 | 691 | 13.5 | 25.32 | + |
| 6 -A | 300 | 12 | 810 | 738 | 8.9 | 27.58 | + |
| 7 -A | 370 | 6 | 748 | 666 | 11.0 | 22.88 | |
| 8 -A | 370 | 9 | 863 | 666 | 22.8 | 23.47 | |
| 9 -A | 370 | 9 | 842 | 666 | 20.9 | 24.39 | |
| 10 -A | 370 | 9 | 761 | 660 | 13.3 | 24.97 | + |

TABLE-continued

Summary of the tests classified by grain size, quantity of water added to the sugar and dose delivered

| Test - composition | Mean diameter of sugar (μm) | Water (%) | Apparent voluminal mass Free (g/l) | Poured (g/l) | Compressibility (%) | Dose (g) | Sediments |
|---|---|---|---|---|---|---|---|
| 11 -A | 370 | 9 | 799 | 723 | 9.5 | 25.05 | |
| 12 -A | 370 | 9 | 884 | 805 | 8.9 | 28.13 | |
| 13 -A | 370 | 12 | 775 | 716 | 7.6 | 24.66 | |
| 14 -A | 370 | 12 | 800 | 731 | 8.6 | 25.76 | |
| 15 -A | 370 | 12 | 766 | 701 | 8.5 | 25.91 | + |
| 16 -B | 438 | 5 | 797 | 711 | 10.8 | 26.30 | |
| 17 -B | 438 | 7 | 803 | 732 | 8.8 | 26.40 | |
| 18 -B | 500 | 6 | 790 | 710 | 10.1 | 23.51 | + |
| 19 -B | 500 | 6 | 793 | 711 | 10.3 | 24.32 | + |
| 20 -A | 500 | 9 | 904 | 731 | 19.1 | 26.89 | +++ |
| 21 -A | 500 | 9 | 870 | 721 | 17.1 | 27.25 | +++ |
| 22 -A | 500 | 9 | 852 | 708 | 16.9 | 27.56 | +++ |
| 23 -A | 500 | 9 | 898 | 781 | 13.0 | 29.41 | +++ |
| 24 -A | 500 | 9 | 870 | 778 | 10.6 | 29.88 | +++ |
| 25 -A | 500 | 12 | 816 | 709 | 13.1 | 25.68 | ++ |
| 26 -A | 500 | 12 | 830 | 716 | 13.7 | 27.49 | ++ |
| 27 -A | 500 | 12 | 908 | 848 | 6.6 | 31.68 | +++ |

The poured and free apparent voluminal masses, the degree of compressibility, the dose delivered and the quantity of sediments present at the bottom of the cup were then measured during the tests. The quantity of sediment was evaluated by giving each test a mark between zero and and four crosses. It is considered that a sediment evaluation mark of two crosses, or more, corresponds to inadequate dispersion of the powder in the hot water which, thus necessitating subsequent stirring, makes the powder unsuitable for use in an automatic hot beverage dispenser.

Examples 8, 9, 10, 11, 12 and 20, 21, 22, 23, 24 clearly show that, all other things being equal, the degree of compressibility determines the dose delivered into the cup by the automatic dispenser.

In addition, it is again clearly apparent that the level of sediments in the cup is definitely related to the initial mean diameter of the sugar, an initial mean diameter of 500 μm appearing to be the upper limit which should not be exceeded.

In addition, the larger the quantity of water added to the sugar, the more the dose delivered will increase, as shown by Examples 3–6, 7–15 and 18–27.

It can be seen that, for the smallest grain sizes (tests 1 and 2), 9% water has to be added to obtain a dose which is just sufficient. Now, this quantity of water constitutes the upper limit which may be added to such a fine sugar. Beyond this quantity, the grains of sugar no longer retain their individuality. It is for this reason that the lower limit of 250 μm constitutes the mean diameter of the sugar below which the grain size must not fall. Preferably, the mean diameter of the sugar is between 300 μm and 450 μm.

In addition, it would seem that, besides the degree of compressibility, the free apparent voluminal mass constitutes a criterion which determines the flow of the product. The higher this voluminal mass, the larger the dose will be and it is for this reason that, at all events, a free apparent voluminal mass of 860 g/l constitutes an upper limit that must not be exceeded.

Finally, it is clearly apparent that, depending on the grain size of the sugar used and the quantity of water added, it is possible reproducibly to obtain different doses using the same dosing unit and without modifying its settings.

Accordingly, the process according to the present invention enables the flow properties of the dry base produced to be effectively controlled through the grain size of the sugar and the extent to which it is moistened.

Example 3

Grain size measurements were carried out in tests 1, 16 and 17 of Example 2. The mean diameter of the constituent particles of the dry base was thus determined.

In addition, grain size curves were obtained for the basic sugars of the product and for the dry bases obtained by the process according to the invention.

For a given dry base, it was found that its grain size curve was shifted to the right and hence, to a larger grain size in relation to the grain size curve of the basic sugar. In very approximate terms, this shift is in fact a simple translation, the profiles of the two grain size curves being very similar. Taking representative points of these two curves, it is thus possible to calculate a mean translation of one curve in relation to the other, this mean translation being equal to twice the average thickness of the coating of cocoa on the sugar. More particularly, it is possible to deduce the minimal and maximum thicknesses of the coating therefrom with a good approximation.

In addition, this analysis shows that, in the large majority of cases, the grains of sugar were individually coated, i.e., they had not undergone any coalescence.

Thus, given a grain of radius R, two agglomerated grains of the same radius will have a volume V of $(4/3) \pi (2R^3)$. The equivalent radius, as determined by the Malvern method, will thus be $Re=(2)^{1/3}R$.

If the mean diameter of the end product is below 1.26 times the diameter of the sugar, it is thus clear that the grains have not coalesced.

It is thus possible to compare the mean diameter of the sugar and the mean diameter of the end product which will have been increased by the thickness of the coating.

The results are set out in the following Table:

| Test | D1 Mean diameter of sugar μm | D2 Mean diameter of end product μm | e Minimum thickness of coating μm | (D2 − 2 · e) / D1 |
|---|---|---|---|---|
| 1 | 261 | 388 | 12 | 1.39 |
| 16 | 438 | 453 | 37 | 0.87 |
| 17 | 438 | 489 | 25 | 1.06 |

It can thus be seen that, for Examples 16 and 17, even taking the estimated minimum values into account, it is clear that the grains of sugar remain individualized and have not agglomerated in twos.

On the other hand, for test 1, it can be seen that, taking the estimated minimum thickness into account, grains may be considered as having agglomerated in twos. It is important in this connection to bear in mind that this test was carried out with an addition of water of 9%, based on the weight of sugar. Accordingly, this confirms that, for small grain sizes, the grains of sugar lose their individuality. It also confirms that, if an even smaller grain size is used, the addition of 9% water produces even greater signs of coalescence of the grains.

Accordingly, it can be seen that the process according to the invention, by substantially avoiding coalescence of the sugar grains, makes it possible to obtain a grain size distribution of the end product which is directly related to that of the basic sugar. It is thus possible effectively to obtain an end product of uniform grain size distribution characterized in particular by the absence of voluminous aggregates which show totally unsatisfactory dispersion in hot water, as demonstrated by the need to have a basic sugar with a mean diameter below 500 μm.

I claim:

1. A particulate beverage base composition comprising particles having a core of an individual crystallized sugar grain having a mean diameter of from 250 μm to 500 μm and a coating of cocoa powder, the composition having a poured apparent voluminal mass (d1) of 630 g/l to 750 g/l, a free apparent voluminal mass (d2) of 750 g/l to 860 g/l and a degree of compressibility (d2-d1)/d2 below 20%.

2. A composition according to claim 1 wherein the individual sugar grains have a mean diameter of from 300 μm to 450 μm.

3. A composition according to claim 1 wherein the particles have a mean diameter of not more than 1.26 times a mean diameter of the individual sugar grains.

4. A particulate beverage base composition comprising particles having a core of an individual crystallized sugar grain having a mean diameter of from 250 μm to 500 μm and a coating of a mixture of cocoa powder and milk solids powder, the composition having a poured apparent voluminal mass (d1) of 630 g/l to 750 g/l, a free apparent voluminal mass (d2) of 750 g/l to 860 g/l and a degree of compressibility (d2-d1)/d2 below 20%.

5. A composition according to claim 4 wherein the individual sugar grains have a mean diameter of from 300 μm to 450 μm.

6. A composition according to claim 4 wherein the composition comprises, by weight based upon a total dry matter weight, from 45% to 60% sugar grains, from 10% to 15% cocoa powder and from 20% to 35% milk powder.

7. A composition according to claim 4 wherein the particles have a mean diameter of not more than 1.26 times a mean diameter of the individual sugar grains.

8. A dried beverage base product having a poured apparent voluminal mass (d1) of 630 g/l to 750 g/l, a free apparent voluminal mass (d2) of 750g /l to 860 g/l and a degree of compressibility (d2-d1)/d2 below 20% obtained by a process comprising moistening individual crystallized sugar grains having a mean diameter of from 250 μm to 500 μm to obtain moistened grains having a moisture content of from 5% to 12% by weight, mixing the moistened grains with at least one coating ingredient comprising cocoa powder so that the at least one coating ingredient coats the grains to obtain individual coated grains, and then drying the coated grains.

9. A product of a process according to claim 8 wherein the crystallized sugar grains to be moistened have a mean diameter of from 300 μm to 450 μm.

10. A product of a process according to claim 8 wherein the at least one coating ingredient further comprises a milk powder which is in admixture with the cocoa powder.

11. A product of a process according to claim 10 wherein the coating ingredients and the moistened sugar grains are mixed in amounts by weight, based upon a total dry matter weight of the coating ingredients and moistened sugar grains, of from 45% to 60% sugar grains, from 10% to 15% cocoa powder and from 20% to 35% milk powder.

12. A product of a process according to claim 8 wherein the process consists essentially of the steps of moistening, mixing and then drying.

13. A product of a process according to claim 10 wherein the process consists essentially of the steps of moistening, mixing and then drying.

14. A product of a process according to claim 8 wherein the individual coated grains have a mean diameter of not more than 1.26 times a mean diameter of the sugar grains to be moistened.

15. A product of a process according to claim 10 wherein the particles have a mean diameter of not more than 1.26 times a mean diameter of the sugar grains to be moistened.

16. A product of a process according to claim 12 wherein the particles have a mean diameter of not more than 1.26 times a mean diameter of the sugar grains to be moistened.

17. A product of a process according to claim 13 wherein the coated grains of the product having a diameter less than 1,400 μm have a mean diameter of not more than 1.26 times a diameter of the sugar grains to be moistened.

* * * * *